US008892813B2

(12) United States Patent
Kannappan et al.

(10) Patent No.: US 8,892,813 B2
(45) Date of Patent: Nov. 18, 2014

(54) INTELLIGENT SCHEDULING OF BACKGROUND OPERATIONS IN MEMORY

(75) Inventors: Vithya Kannappan, Bangalore (IN); Narendhiran Chinnaanangur Ravimohan, Bangalore (IN)

(73) Assignee: SanDisk Technologies Inc., Plano, TX (US)

(*) Notice: Subject to any disclaimer, the term of this patent is extended or adjusted under 35 U.S.C. 154(b) by 293 days.

(21) Appl. No.: 13/533,535

(22) Filed: Jun. 26, 2012

(65) Prior Publication Data

US 2013/0282960 A1    Oct. 24, 2013

(30) Foreign Application Priority Data

Apr. 20, 2012 (IN) .................. 1261/MUM/2012

(51) Int. Cl.
*G06F 12/02* (2006.01)

(52) U.S. Cl.
USPC .................................. 711/103; 711/E12.008

(58) Field of Classification Search
USPC ........................................ 711/103, E12.008
See application file for complete search history.

(56) References Cited

U.S. PATENT DOCUMENTS

| 2006/0190938 A1 | 8/2006 | Capek et al. |
| 2008/0294814 A1 | 11/2008 | Gorobets |
| 2010/0287217 A1 | 11/2010 | Borchers et al. |

*Primary Examiner* — Yong Choe
(74) *Attorney, Agent, or Firm* — Brinks Gilson & Lione (57) ABSTRACT

A memory system or flash card may include an algorithm for identifying a pattern in a sustained or continuous write operation. In one example, a video recording device may be a host that continuously writes data to a memory card in an identifiable pattern. The pattern identification algorithm may be stored in the firmware of the memory card and used to schedule background operations during the predicted idle times in which the host is not writing data to the memory card.

20 Claims, 10 Drawing Sheets

INTELLIGENT SCHEDULING OF BACKGROUND OPERATIONS IN MEMORY

PRIORITY

This application claims priority to Indian Patent Application No. 1261/MUM/2012, filed on Apr. 20, 2012, entitled "INTELLIGENT SCHEDULING OF BACKGROUND OPERATIONS IN MEMORY," the entire disclosure of which is hereby incorporated by reference.

TECHNICAL FIELD

This application relates generally to memory devices. More specifically, this application relates to improving scheduling of background operations in non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. During periods of continuous writing, a failure may occur as a result of memory management or background operations that are performed during the sustained writing.

The failure may include a host buffer fill or accumulated time out. The host buffer may be filled when the background operations slow the write speed and the host is forced to maintain more data to be written in the buffer. When the amount of data the host has in the buffer exceeds the limit, there may be a host buffer fill error. The accumulated time out may include a failure observed in picture capture and video recording in some hosts where the host has an internal write timeout that is set for each chunk of data write. When the memory card's write operation takes longer than the timeout time period for completing one write multiple block the host times out and results in picture capture failure. Accumulated time out refers to the accumulated write operation duration (e.g., the time to write x number of blocks in a single write multiple block command) in the card, which may be caused by multiple block writes sent continuously. For a particular host, a picture may be corrupted or not saved due to the accumulated time out. Likewise, in case of video recording, a frame may be lost or recording may be stopped with an error message.

SUMMARY

It may be desirable to identify patterns in sustained or continuous writing, so that background operations can be scheduled during idle time. For example, video recording to a memory card may include sustained writing and the data may be written in data chunks. During the write operation, a learning phase may identify the pattern of those chunks using a card-based algorithm that may be part of the memory card firmware. The pattern identified may include the idle time that occurs between successive data chunks. In other words, each data chunk may have an associated idle time that follows the data chunk and precedes the next data chunk in the pattern. Background operations can then be optimally scheduled during the idle times based on the identified pattern.

According to a first aspect, a flash memory device includes a non-volatile storage having an array of memory blocks storing data. A controller in communication with the non-volatile storage is configured for receiving data chunks from a host to be stored in the non-volatile storage and identifying, with firmware on the flash memory device, a pattern based on the received data chunks. The pattern comprises data chunks and corresponding idle time. The controller schedules background operations during the idle time.

According to a second aspect, a memory system comprises a non-volatile storage for storing data and a host interface module for receiving the data to be stored on the non-volatile storage. A back end interface module communicates with the non-volatile storage and a controller is in communication with the host interface module and the back end interface module. The controller is configured for utilizing a pattern recognition algorithm with the host interface module for identifying a pattern of the received data and scheduling background operations with the back end interface module during idle time. The idle time is predicted based on the pattern recognition algorithm.

According to a third aspect, a method for scheduling background operations in a flash memory device comprises a controller in a non-volatile storage device that monitors data chunks received during a continual write operation and compares successive data chunks to determine whether a time and data amount for each of the successive data chunks is equivalent. The controller repeats the comparison of successive data chunks as long as the successive data chunks are equivalent and until a threshold number of data chunks have been compared. The controller recognizes a pattern when the threshold number of the data chunks have been compared and each of those successive data chunks are equivalent and schedules background operations during the predicted idle time. The pattern comprises recognizing a timing for data chunks and recognizing the idle times during which there is no data chunks to be written.

BRIEF DESCRIPTION OF THE PRESENTLY PREFERRED EMBODIMENTS

Figure 1:
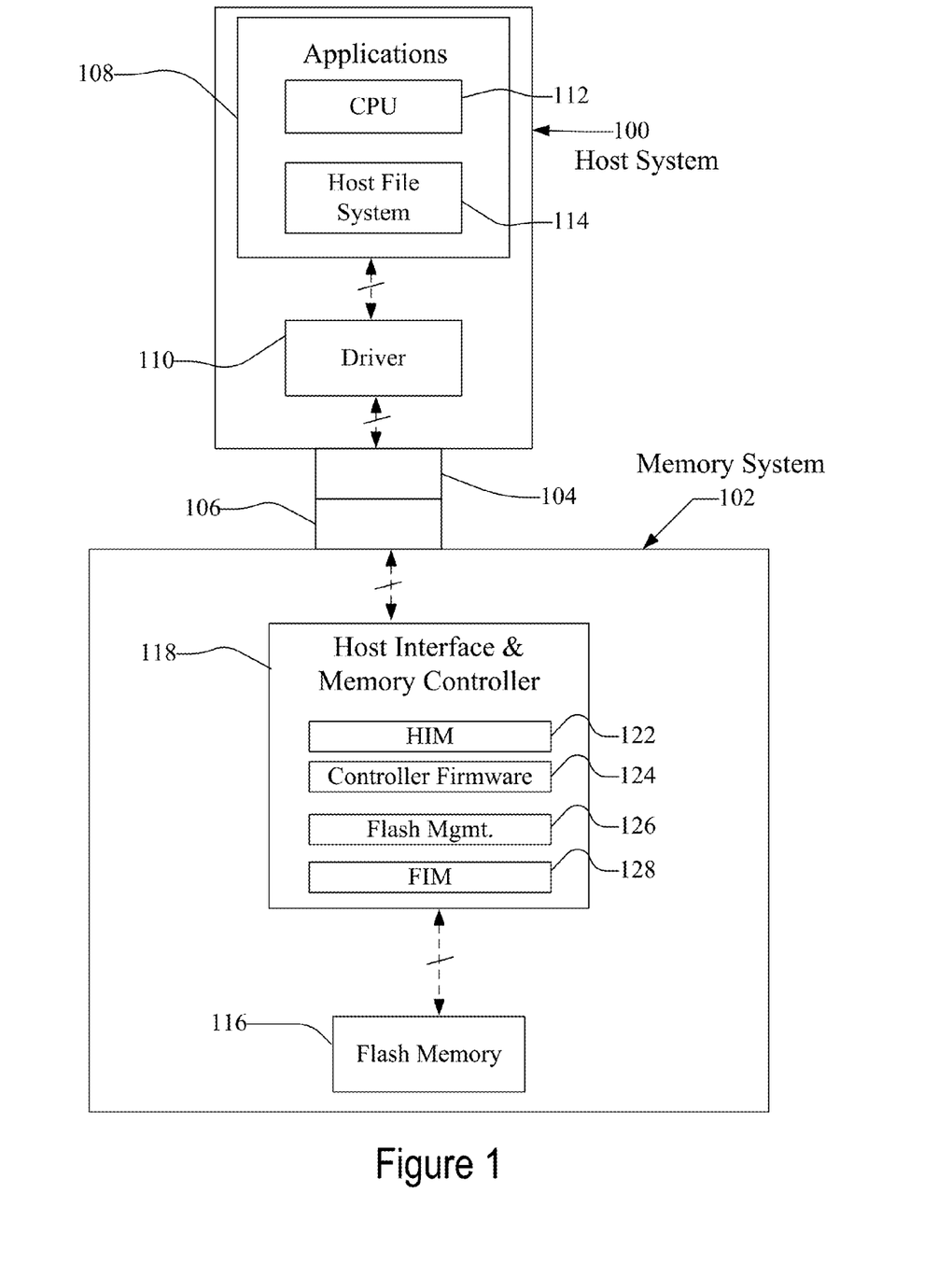
FIG. 1 is a block diagram of a host connected with a memory system having non-volatile memory.

A flash memory system suitable for use in implementing aspects of the invention is shown in FIGS. 1-5. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The host system 100 of FIG. 1 may be viewed as having two major parts, insofar as the memory 102 is concerned, made up of a combination of circuitry and software. They are an applications portion 108 and a driver portion 110 that interfaces with the memory 102. There may be a central processing unit (CPU) 112 implemented in circuitry and a host file system 114 implemented in hardware or software. In a PC, for example, the applications portion 108 may include a processor 112 running word processing, graphics, control or other popular application software. In a camera, cellular telephone or other host system 114 that is primarily dedicated to performing a single set of functions, the applications portion 108 includes the software that operates the camera to take and store pictures, the cellular telephone to make and receive calls, and the like.

The memory system 102 of FIG. 1 may include non-volatile memory, such as flash memory 116, and a system controller 118 that both interfaces with the host 100 to which the memory system 102 is connected for passing data back and forth and controls the memory 116. The system controller 118 may convert between logical addresses of data used by the host 100 and physical addresses of the flash memory 116 during data programming and reading. Functionally, the system controller 118 may include a Host interface module (HIM) 122 that interfaces with the host system controller logic 110, and controller firmware module 124 for coordinating with the host interface module 122, flash interface module 128, and flash management logic 126 for internal memory management operations such as garbage collection, and one or more flash interface modules (FIMs) 128 to provide a communication interface between the controller with the flash memory 116.

Figure 2:
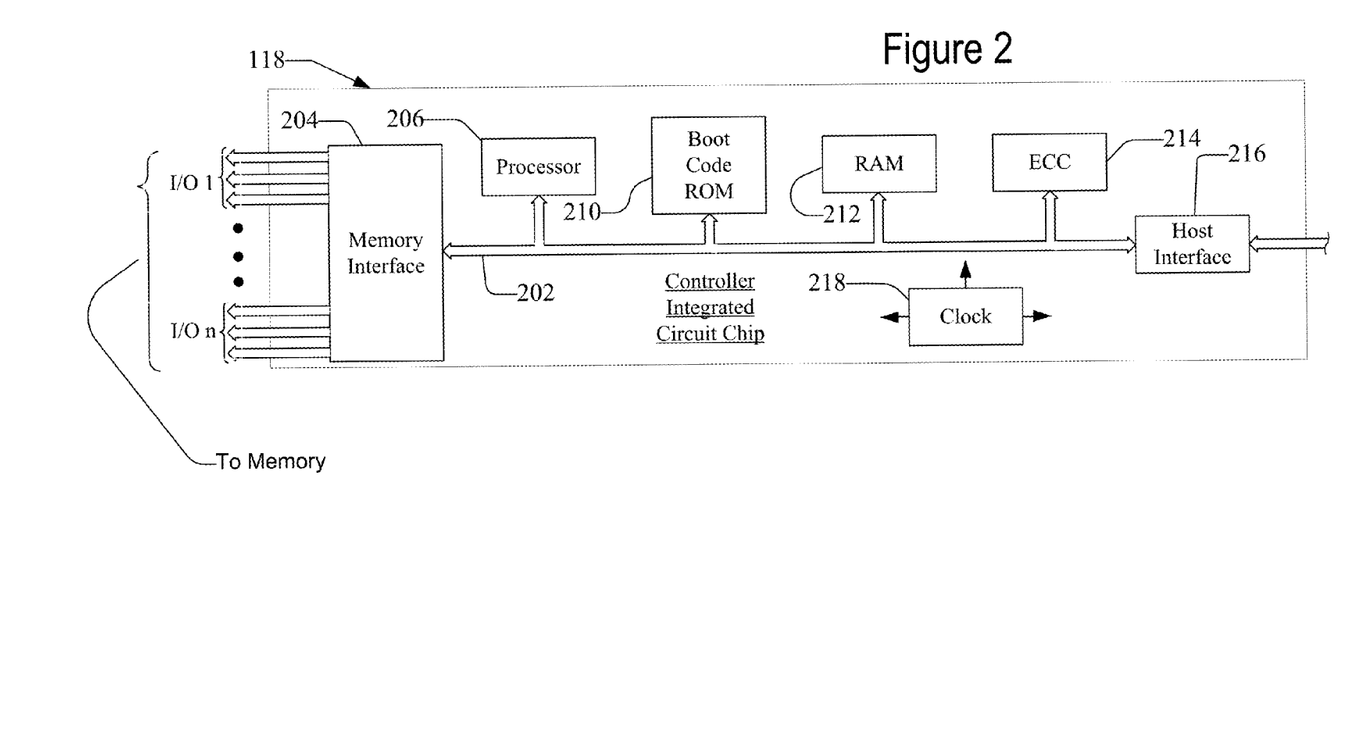
FIG. 2 is a block diagram of an exemplary flash memory system controller for use in the system of FIG. 1.

The system controller 118 may be implemented on a single integrated circuit chip, such as an application specific integrated circuit (ASIC) such as shown in FIG. 2. The processor 206 of the system controller 118 may be configured as a multi-thread processor capable of communicating via a memory interface 204 having I/O ports for each memory bank in the flash memory 116. The system controller 118 may include an internal clock 218. The processor 206 communicates with an error correction code (ECC) module 214, a RAM buffer 212, a host interface 216, and boot code ROM 210 via an internal data bus 202.

The ROM 210 may be used to initialize a memory system 102, such as a flash memory device. The memory system 102 that is initialized may be referred to as a card. The ROM 210 in FIG. 2 may be a region of read only memory whose purpose is to provide boot code to the RAM for processing a program, such as the initialization and booting of the memory system 102. The ROM may be present in the ASIC rather than the flash memory chip.

Figure 3:
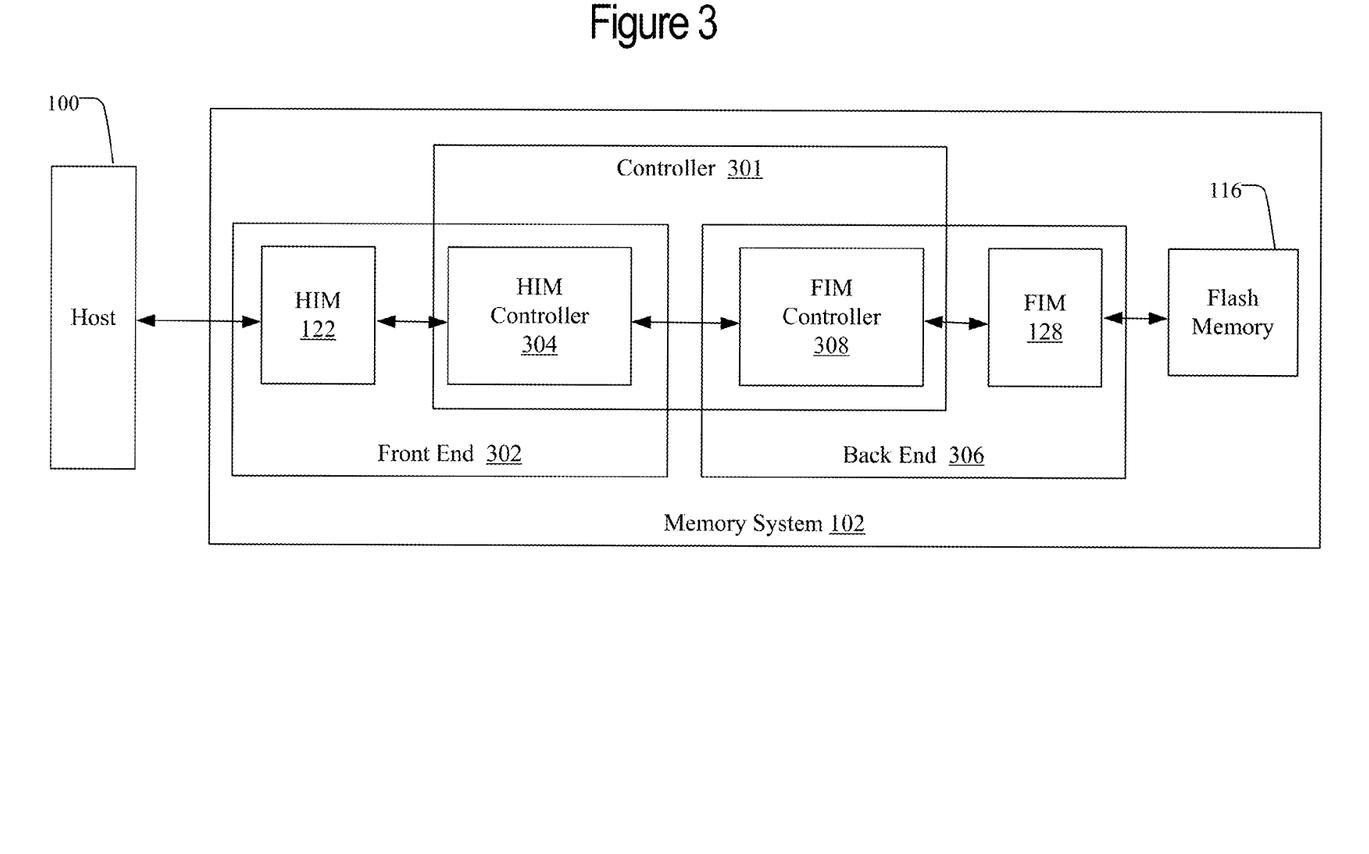
FIG. 3 is a block diagram of an alternative memory communication system.

FIG. 3 is a block diagram of an alternative memory communication system. The host system 100 is in communication with the memory system 102 as discussed with respect to FIG. 1. The memory system 102 includes a front end 302 and a back end 306 coupled with the flash memory 116. In one embodiment, the front end 302 and the back end 306 may be referred to as the memory controller and may be part of the system controller 118. The front end 302 may logically include a Host Interface Module (HIM) 122 and a HIM controller 304. The back end 306 may logically include a Flash Interface Module (FIM) 128 and a FIM controller 308. Accordingly, the controller 301 may be logically portioned into two modules, the HIM controller 304 and the FIM controller 308. The HIM 122 provides interface functionality for the host device 100, and the FIM 128 provides interface functionality for the flash memory 116. The HIM controller 304 may include a Pattern Identification Algorithm (PIA) to determine pattern of the incoming received data. The incoming received data from host may include video and image data. The PIA is further explained with respect to FIGS. 6-8. The controller 301 may be coupled with a data buffer (not shown).

In operation, data is received from the HIM 122 by the HIM controller 304 during a write operation of host device 100 on the memory system 102. The PIA in the HIM controller 304 may identify a pattern of the host write and predict an idle time between the write operations. The HIM controller 304 may pass control of data received to the FIM controller 308. The FIM controller 308 may determine how the received data is to be written onto the flash memory 116 optimally, which may depend on the identified pattern of the received data. The received data may be provided to the FIM 128 by the FIM controller 308 for writing data onto the flash memory 116 based on the determination made by the FIM controller 308. Further, the FIM controller 308 may execute the background operations during the predicted idle time. The writing process from the host 100 to the flash memory 116 is further described with respect to FIG. 9.

Background operations may be necessary within the memory system 102. For simplicity, a memory card may be used as an exemplary embodiment of the memory system 102. Exemplary background operations may include garbage collection for organizing memory blocks and erasing unnecessary or obsolete blocks. Additional background operations may include folding or bad block management. The background operations may adversely affect the performance of the card. For example, the reduced sustained write speed may result in failure of video capture in several hosts. For example, in a camera host, the sustained write speed capability for a particular card may degrade from 8 megabytes per second (MB/s) to 4 MB/s in one example due to background operations. If the requirement for the host was 6 MB/s in that example, then the video write will fail or suffer an error.

Figure 4:
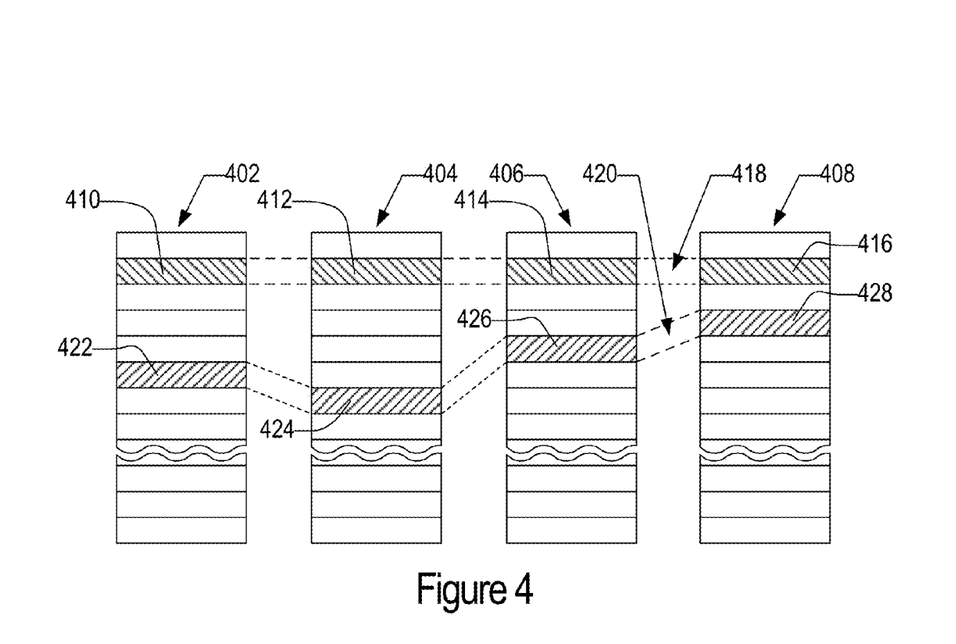
FIG. 4 is an example physical memory organization of the system of FIG. 1.

FIG. 4 conceptually illustrates an organization of the flash memory 116 (FIG. 1) as a cell array. The flash memory 116 may include multiple memory cell arrays which are each separately controlled by a single or multiple memory controllers 118. Four planes or sub-arrays 402, 404, 406, and 408 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as blocks. Blocks of memory cells are shown in FIG. 4 by rectangles, such as blocks 410, 412, 414, and 416, located in respective planes 402, 404, 406, and 408. There can be any number of blocks in each plane.

The block of memory cells is the unit of erase, and the smallest number of memory cells that are physically erasable together. For increased parallelism, however, the blocks may be operated in larger metablock units. One block from each plane is logically linked together to form a metablock. The four blocks 410, 412, 414, and 416 are shown to form one metablock 418. All of the cells within a metablock are typically erased together. The blocks used to form a metablock need not be restricted to the same relative locations within their respective planes, as is shown in a second metablock 420 made up of blocks 422, 424, 426, and 428. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
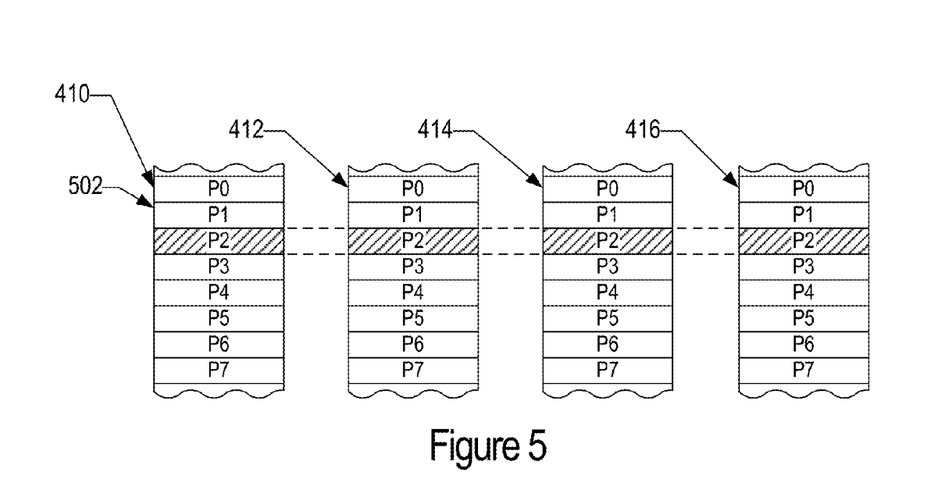
FIG. 5 is an expanded view of a portion of the physical memory of FIG. 4.

The individual blocks are in turn divided for operational purposes into pages of memory cells, as illustrated in FIG. 5. The memory cells of each of the blocks 410, 412, 414, and 416, for example, are each divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 502 is illustrated in FIG. 4, being formed of one physical page from each of the four blocks 410, 412, 414, and 416. The metapage 502, for example, includes the page P2 in each of the four blocks but the pages of a metapage need not necessarily have the same relative position within each of the blocks. A metapage may be the maximum unit of programming.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material. In implementations of MLC memory operated to store two bits of data in each memory cell, each memory cell is configured to store four levels of charge corresponding to values of "11," "01," "10," and "00."

A host device 100 (e.g. a camera or a mobile device) may write data (e.g. video or pictures) onto the memory card in determinable patterns per second or per data chunks, such as per picture (e.g. one data chunk is one picture). The determinable patterns may include groups or chunks of data that are written periodically during a sustained or continuous writing. A data chunk may include a sustained writing of data. For example, video data may be written in periodic chunks to the flash memory. Each of the data chunks may be followed by an associated or corresponding idle time that occurs between data chunks. In other words, each of the data chunks are sustained writing of data with idle time between the data chunks. The idle time may also be referred to as a delay between the writing of data chunks. In other words, if the flash memory is fast enough to complete the periodic chunk within a stipulated time, then the remaining time is free and idle before the next chunk is received. In the example of writing picture data, there may be an idle time between two picture writes either due to the time the user takes to click the picture in single mode or due to the time the camera lens takes to get ready in burst mode. The data chunks and associated idle time may be part of the pattern that is identified. The identified pattern includes identifying the data chunks and corresponding delay or idle time between data chunks. In other words, the pattern includes a data chunk, idle time, another data chunk, another idle time, etc.

Since the data may arrive in determinable patterns with periodic chunks of data, the degradation of the sustained write speed during data write may be reduced by designing an intelligent firmware module that schedules background operations during idle time by analyzing the host write pattern. In one embodiment, the pattern recognition algorithm may reside inside the HIM controller 304 and is activated when data is being written by the host 100.

Figure 6:
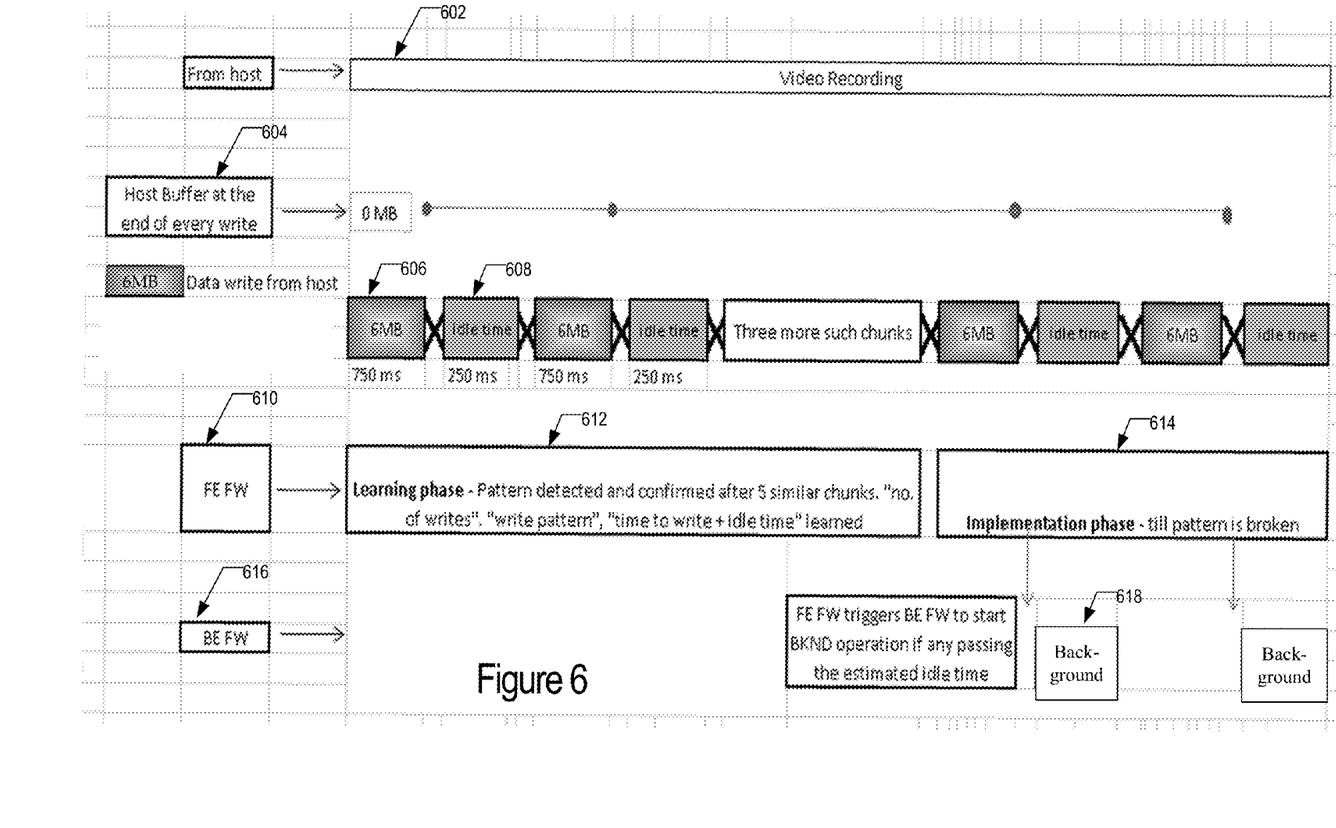
FIG. 6 is a diagram of pattern learning and implementation of background operations based on the pattern learning.

FIG. 6 is a diagram of pattern learning and implementation of background operations based on the pattern learning FIG. 6 illustrates a timeline in which a host is writing to a memory card. In this example, the host is a camera and the data being written is a video recording 602. The host writes video data to the memory card, but maintains a host buffer 604 for the video data that is to be written to the card. When the card cannot keep up with the data that the host is writing, some of the data may be temporarily stored on the host buffer to eventually be written to the card. As described below, a pattern identification algorithm (PIA) may be used for determining the optimal time for performing background operations. The PIA may also be referred to as a pattern recognition algorithm and may be generated during a learning phase. If the background operations are not performed at the optimal time, the host buffer 604 may gradually be filled if the card cannot simultaneously maintain the video data writing and the background operations.

The video recording data 602 may actually be chunks of data that are provided from the host periodically. FIG. 6 illustrates one example where the video recording data 602 is written from the host in 750 milliseconds (ms) during every second. One chunk of video data 606 is written for 750 ms followed by a delay or idle time 608 for 250 ms. As shown there are multiple chunks 606 of data to be written and associated amounts of idle time 608. In other words, every second may include 750 ms of writing a data chunk 606 and 250 ms of idle time 608. Many hosts provide and write data in chunks such as the 6 megabyte (MB) chunk 606 that is written in FIG. 6.

The front end firmware 610, which may be a part of the front end 302, includes the PIA for identifying a pattern, as well as functionality for implementing changes based on the identified patterns. In particular, the front end firmware 610 may utilize a learning phase 612 in which a number of blocks are monitored over a period of time in order to recognize or identify a pattern. As shown in FIG. 6, the learning phase includes five chunks of data (along with the five corresponding amounts of idle time) over which the pattern is recognized. In alternative embodiments, fewer chunks may be used for the learning phase in order to more quickly get to the implementation phase, or more chunks may be used for the learning phase in order to more accurately identify the pattern. In the implementation phase 614, the front end firmware 610 may provide instructions to the back end firmware 616 regarding the optimal times for the background operations 618 to be run. In particular, the back end firmware 616, which may be a part of the back end 306, controls the background operations 618. FIG. 6 illustrates that the background operations 618 are performed during the associated idle times 608. By performing background operations 618 during idle time rather than during the video write chunks 606, the host buffer usage can be minimized and possible failure rates are decreased. When the background operations run during the writing of a data chunk 606, the write operation becomes slow on the card and host buffer gets filled as the filling speed is greater than the emptying speed.

Figure 7:
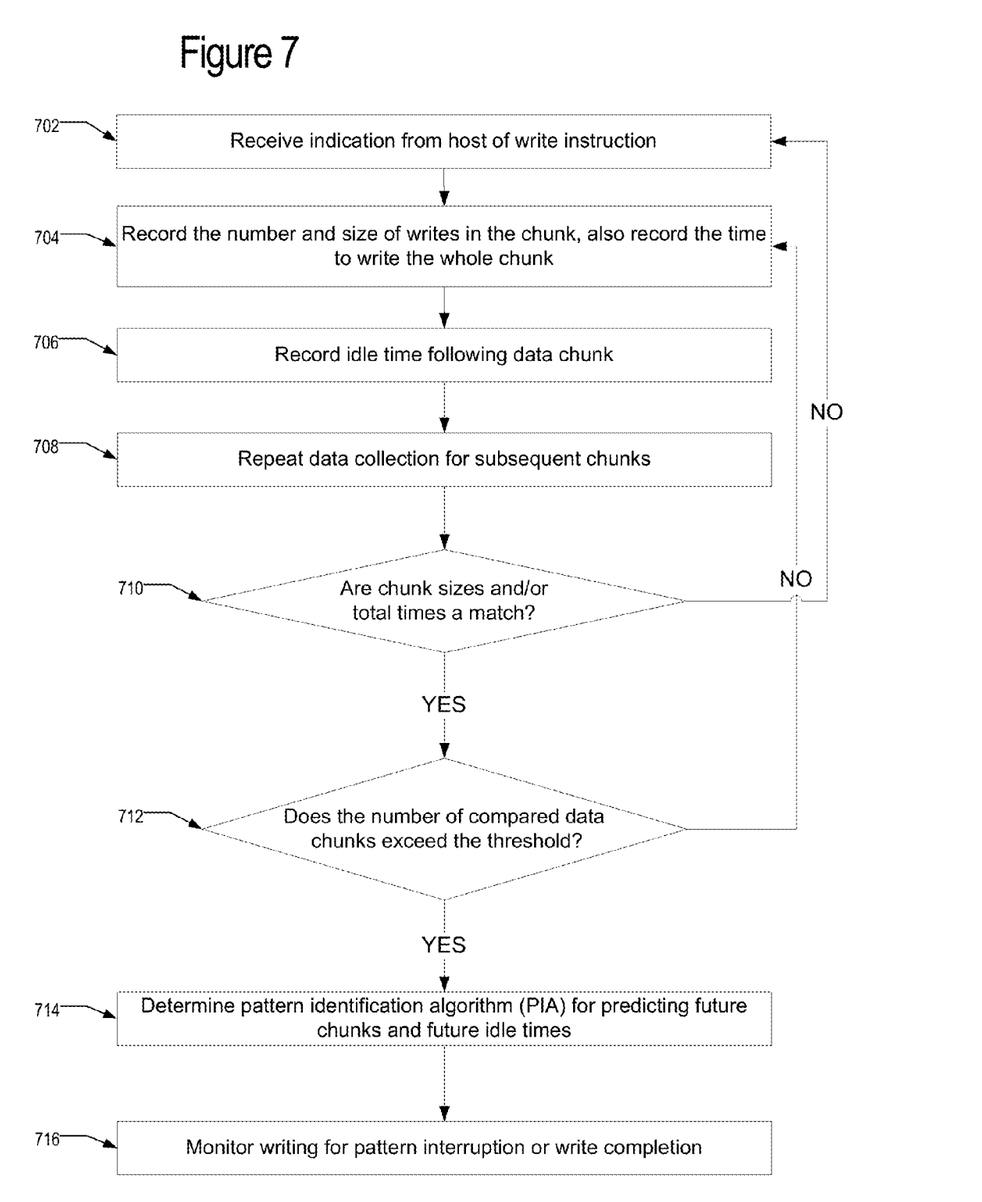
FIG. 7 is a flowchart illustrating the pattern identification algorithm.

FIG. 7 is a flowchart illustrating the pattern identification algorithm. The learning phase 612 may be further illustrated in the flowchart of FIG. 7. In block 702, there may be an indication from a host device (e.g. camera) that writing to a memory card may begin. In block 704, the number and size of a data chunk to be written by the host to the card is recorded. In addition, the time to write the whole chunk is recorded. In the example of FIG. 6, the data chunks are 6 MB and last for 750 ms out of every second. In block 706, the idle time length is recorded. The idle time may follow the writing of a data chunk. In the example of FIG. 6, each data chunk was followed by 250 ms of idle time. The data collection in blocks 704-706 may be repeated for subsequent chunks as in block 708. In block 710, there may be a comparison (e.g. FIG. 8) and if there is no match, then the pattern matching process may be restarted. The chunk sizes and/or total times may be compared in block 710. If there is a match between the consecutive chunks in block 710, then a determination is made as to how many consecutive chunks have been matched in block 712. If there have not been a minimum number of chunks and comparisons, then the next data chunk and idle time may be compared. In one embodiment, the minimum threshold for chunks is five chunks or four consecutive comparisons. If the threshold of comparisons has been met, then the learning phase is completed with a proper number of matches sufficient to identify a pattern in block 714. In other words, the comparisons are used to determine a pattern identification algorithm (PIA) that can be used for predicting future chunks and future idle times. The PIA may be used for scheduling background operations during idle times. In block 716, the pattern may be monitored for a determination of when the continuous writing is stopped for the pattern changes. The process illustrated in FIG. 7 may be implemented in the firmware of the memory card, and in particular, may be through the front end of the card, which may control the background operations for the back end of the card.

Figure 8:
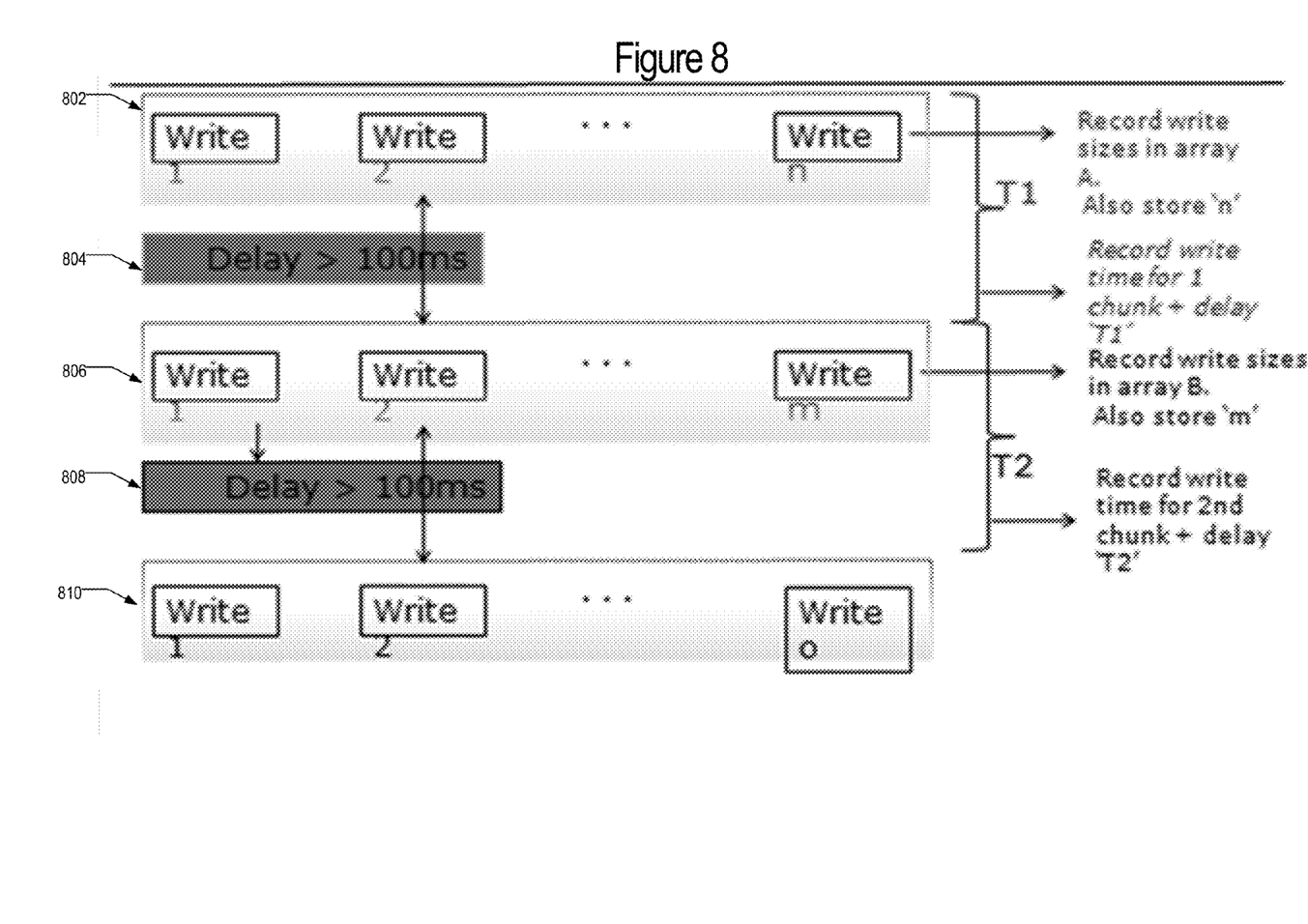
FIG. 8 illustrates pattern recognition during writing.

FIG. 8 illustrates pattern recognition during writing. The first chunk 802 includes n writes of data followed by a first delay 804. The delay may also be referred to as idle time as discussed above. The combination of the first chunk 802 and the first delay 804 are time T1. The second chunk 806 of m writes of data is followed by a second delay 808. The combination of the second chunk 806 and the first delay 808 are time T2. The process continues for the third chunk 810 until a threshold number of chunks have been recorded as part of the learning phase. In one embodiment, the threshold of chunks for the learning phase is five. In other embodiments, the process in FIG. 8 may continue after the learning phase in order to verify that the identified pattern continues and does not need to be modified. In one embodiment, the recorded size and times of the data chunks as well as the idle times are recorded in one or more arrays for analysis and identifying a pattern.

The function of the pattern identification algorithm (PIA) may be to identify the data write patterns (e.g. chunk size of data) during continuous writes, such as with picture or video writing. In one embodiment, the PIA may include collecting multiple write sizes in an array and also the delays between the writes as shown in FIG. 8. There may be a minimum threshold for the delays, such as 100 milliseconds (ms). Once a minimum threshold of chunks/delays are identified (e.g. 5 chunks) the data chunks are all compared. The comparison may include the total number of multiple block writes (i.e. n, m, and o in FIG. 8) and the number of sector writes in each multiple block write. The comparison may require each comparison to be at a certain level. In one embodiment, the number of multiple block writes may be expected to be an exact match while the number of sector writes in each multiple block write may be expected to be at least an 80% match. The sector writes in each multiple block write may vary depending on a frame size or picture size. The comparison may be performed on successive data chunks and after the minimum threshold of matches (e.g. five data chunks or four matches), then a pattern is identified.

Figure 9:
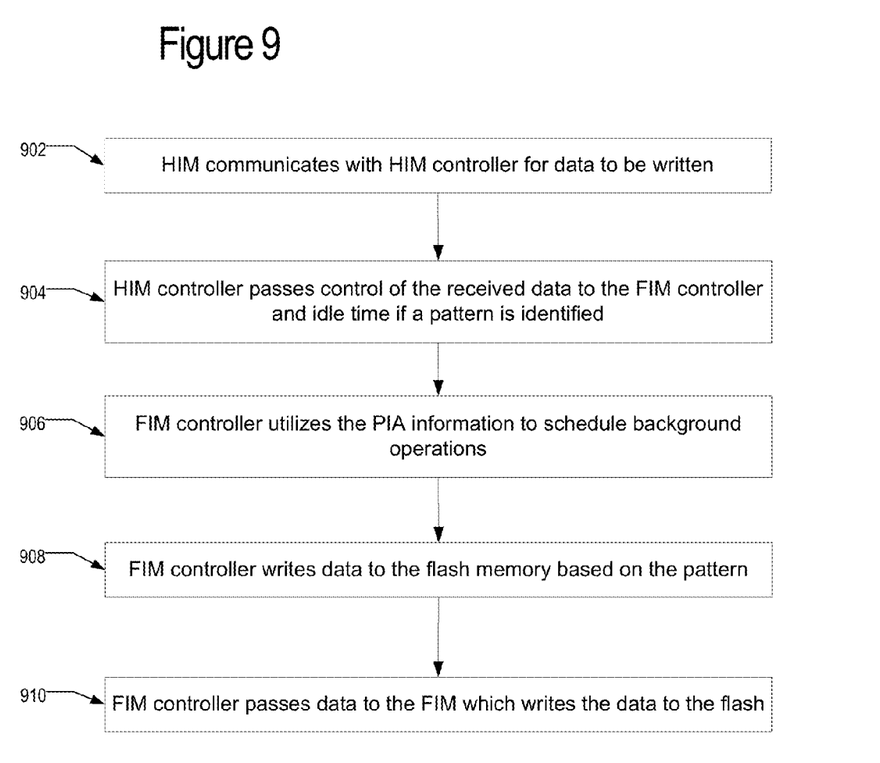
FIG. 9 is a flowchart illustrating a write operation implementing known patterns.

FIG. 9 is a flowchart illustrating a write operation implementing known patterns. In particular, the PIA may already be known and is applied to the writing of data from the host to the card. As discussed in FIGS. 6-8, a learning phase may be utilized to identify a pattern and determine the PIA. In block 902, the Host Interface Module (HIM) 122 communicates with the HIM controller 304 regarding data to be written to the card from the host. In block 904, the HIM controller 304 passes control of the received data to the Flash Interface Module (FIM) controller 308. The idle time may also be passed if a pattern is identified. After the learning phase, the front end 302 passes the PIA information to the FIM controller 308. In block 906, the FIM controller 308 utilizes the PIA information to schedule background operations based on an identified pattern. In block 908, the FIM controller 308 writes data to the flash memory based on the pattern. In block 910, the FIM controller 308 passes data to the FIM 128 which writes the data to the flash. In one embodiment, the background operations scheduled by the back end 306 through the FIM controller 308 are only scheduled during the idle times as identified in the PIA. Accordingly, in block 908, the FIM controller 308 schedules background operations during idle time and the FIM 128 performs the background operations at those times. The PIA will be active even in the implementation phase identifying a pattern and when a pattern is found to be broken; it may quit the implementation phase and start looking for a new pattern.

Figure 10:
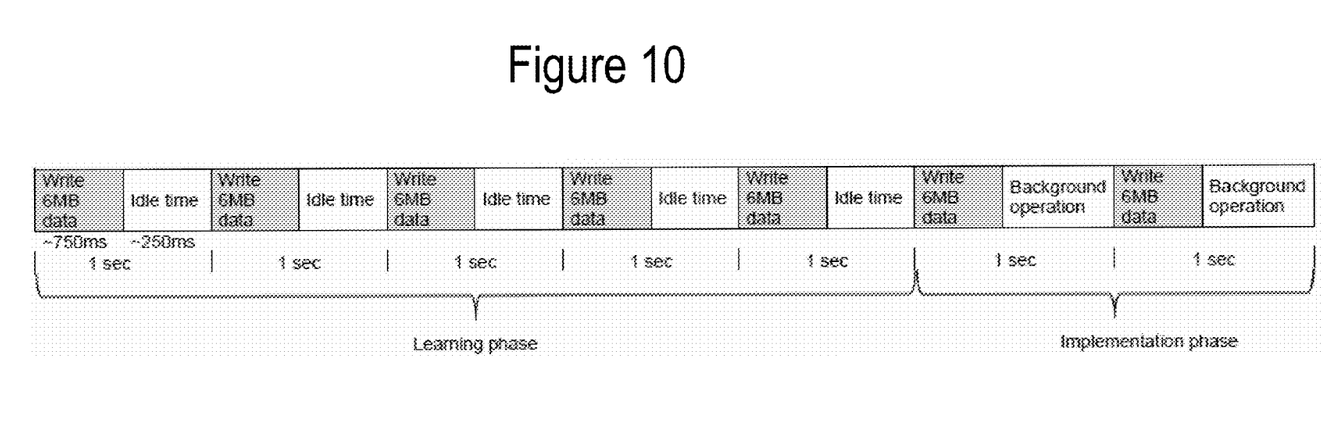
FIG. 10 is a diagram of an exemplary pattern.

FIG. 10 is a diagram of an exemplary pattern. In particular, FIG. 10 illustrates an exemplary pattern or writing 6 megabytes (MB) of data for 750 milliseconds (ms) followed by 250 ms of idle time. This example may be for continuous video recording. In other words, every second includes 750 ms of writing of data, followed by 250 ms of idle time. FIG. 10 illustrates that the learning phase for identifying the pattern is for five seconds (5 sets of 6MB writes followed by 5 respective idle times). The implementation phase then follows the learning phase in which the pattern identification is used for efficiently controlling background operations. Accordingly, the implementation phase illustrates background operations that follow the 6 MB data writes. The background operations are only scheduled during the idle times.

As discussed, the pattern detection algorithm includes three conditions for comparing successive chunks: 1) comparing the number of writes (e.g. blocks written during a writing chunk); 2) determining if the write times are within a certain percentage (e.g. write time and following idle time are within 5% of successive chunk of write time and associated idle time); and 3) determining whether the elements of the chunks are a percentage match based on size (e.g. the total size of the matched elements divided by the total size of the bigger size's elements are within 80%). This comparison may be continued with three more successive chunks to identify a pattern. During the implementation phase, the number of writes, average write times and write size may be monitored to determine whether the implementation phase is still active (i.e. the pattern is continuing) or whether the pattern has changed, and the learning phase may identify a new or different pattern.

Figure 11:
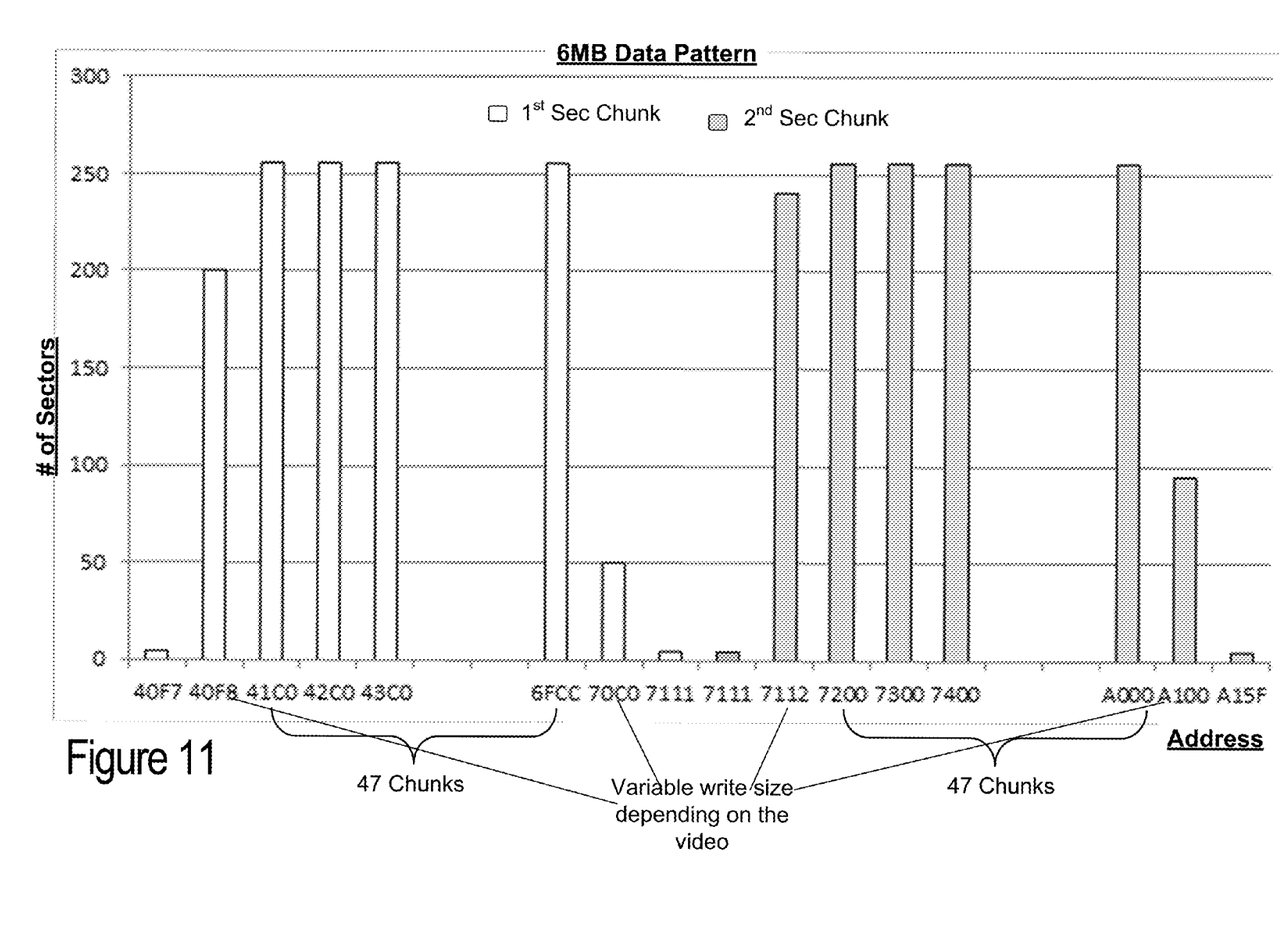
FIG. 11 is a bar graph illustrating a write operation.

FIG. 11 is a bar graph illustrating a write operation. In particular, FIG. 11 may correspond with the pattern shown in FIG. 10 and may utilize the three conditions discussed above. There is a first chunk ($1^{st}$ second chunk) and a second chunk ($2^{nd}$ second chunk) that are compared to identify a potential pattern. The write pattern may include 6 megabyte (MB) chunks that have potentially differing number of sectors written for each address. The PIA may compare the pattern during the $1^{st}$ second with the pattern during the $2^{nd}$ second. As shown in FIG. 11, a first chunk has a value of n=51, T1=1 second, and the first matrix A={1,200,256,256,256, ..., 50,1}. For the second chunk, m=51, T2=1.025 seconds, and second matrix B={1,240,256,256,256, ..., 95,1}. The two chunks may then be compared with the following conditions: 1) m=n=51; 2) T2<T1+5%; and 3) the two matrices are a one-one 97% match. In other words, for condition three, the sum of A=12284, the sum of B=12369, so the sum of the matching elements=12034. The percentage match is the sum of matching elements divided by the sum of bigger matrix which is 12034/12369=97%. Based on the above conclusions, n=51, Ts or average total time=1.012 seconds, and a sample matrix S={1,X,256,256,256, ..., X,1}. X is used to identify elements that don't match in size and are ignored. The variables n, Ts, and S may be used to compare with a subsequent three chunks as part of the learning phase, or those variables may be used confirm and monitor that the pattern is continuing and has not changed (during the implementation phase, after the learning phase identified a pattern). The sample matrix may be used comparing the next three chunks during the learning phase to identify a common pattern that may then be used in the implementation phase. In this case, the total write time plus idle time is one second. This time is passed onto the back end firmware to schedule for any background operations. The backend knows that if the write ends in 750 ms, it has 250 ms idle time before the next write to schedule the background operation.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A flash memory device comprising:
a non-volatile storage having an array of memory blocks storing data; and
a controller in communication with the non-volatile storage, the controller is configured for:

receiving data chunks from a host to be stored in the non-volatile storage;

identifying, with firmware on the flash memory device, a pattern based on the received data chunks, wherein the pattern comprises data chunks and idle time between successive data chunks; and scheduling background operations during the idle time.

2. The device of claim 1 wherein the identifying by the controller further comprises:

comparing successive data chunks;

repeating the comparison of successive chunks when the comparison of the successive data chunks indicate a pattern, wherein the pattern identifies the idle time between the successive chunks; and identifying the pattern after a threshold for the number of data chunks compared is reached.

3. The device of claim 2 wherein the threshold for the number of data chunks to compare is five.

4. The device of claim 2 wherein the comparison of the successive data chunks comprises a comparison of a time for writing each of the data chunks and a comparison of a size of each of the data chunks.

5. The device of claim 4 wherein the pattern is identified when the threshold of the number of chunks compared is reached and when the comparison for time and data size for each of those successive data chunks is within an error limit.

6. The device of claim 2 wherein the identifying by the controller further comprises comparing successive amounts of the idle time, wherein the pattern is indicated when the successive amounts of the idle time are similar within an error limit.

7. The device of claim 1 wherein the identifying by the controller further comprises generating a pattern identification algorithm.

8. The device of claim 7 wherein the pattern identification algorithm is used by a back end of the flash memory device for the scheduling of the background operations.

9. The device of claim 8 wherein the identifying is with a front end of the flash memory device and the scheduling is with a back end of the flash memory device.

10. The device of claim 9 wherein the front end comprises a host interface module and the back end comprises a flash interface module.

11. A memory system comprising:

a non-volatile storage for storing data;

a host interface module for receiving the data to be stored on the non-volatile storage;

a back end interface module for communicating with the non-volatile storage; and a controller in communication with the host interface module and the back end interface module, wherein the controller is configured for:

utilizing a pattern identification algorithm with the host interface module for identifying a pattern of the received data; and scheduling background operations with the back end interface module during idle time, further wherein the idle time is predicted based on the pattern identification algorithm.

12. The memory system of claim 11 wherein the non-volatile storage comprises a flash memory.

13. The memory system of claim 12 wherein the back end interface module comprises a flash interface module.

14. The memory system of claim 11 wherein the received data comprises data chunks.

15. The memory system of claim 14 wherein idle time occurs between the data chunks.

16. The memory system of claim 15 wherein the pattern identification algorithm comprises an identification of a timing for each of the data chunks and a timing for when the idle time occurs.

17. The memory system of claim 16 wherein the pattern identification algorithm is generated when the controller is configured for:

comparing successive data chunks;

repeating the comparison of successive data chunks when the comparison of the successive data chunks indicate a pattern; and recognizing the pattern after a threshold for the number of data chunks compared is reached.

18. The memory system of claim 17 wherein the pattern is recognized when the threshold of the number of data chunks compared is reached and when the comparison for the timing for each of those successive data chunks and successive idle times is within an error limit.

19. The memory system of claim 16 wherein the timing for each of the data chunks comprises a chunk of time in which the data chunk is written and the timing for each of the idle time comprises an amount of time in which there is no writing with the back end interface module.

20. A method for scheduling background operations in a flash memory device comprising:

in a non-volatile storage device having a controller and blocks of memory, the controller:

monitors data chunks received during a sustained write operation and idle time that occurs during a delay between successive data chunks;

compares successive data chunks to determine whether a time and data amount for each of the successive data chunks is equivalent;

repeats the comparison of successive data chunks as long as the successive data chunks are equivalent and until a threshold number of data chunks have been compared; and recognizes a pattern when the threshold number of data chunks have been compared and each of those successive data chunks are equivalent; and schedules background operations during the idle time, wherein the pattern comprises recognizing a timing for data chunks and recognizing the idle times during which there is no data chunks to be written.

* * * * *